Figure 1:
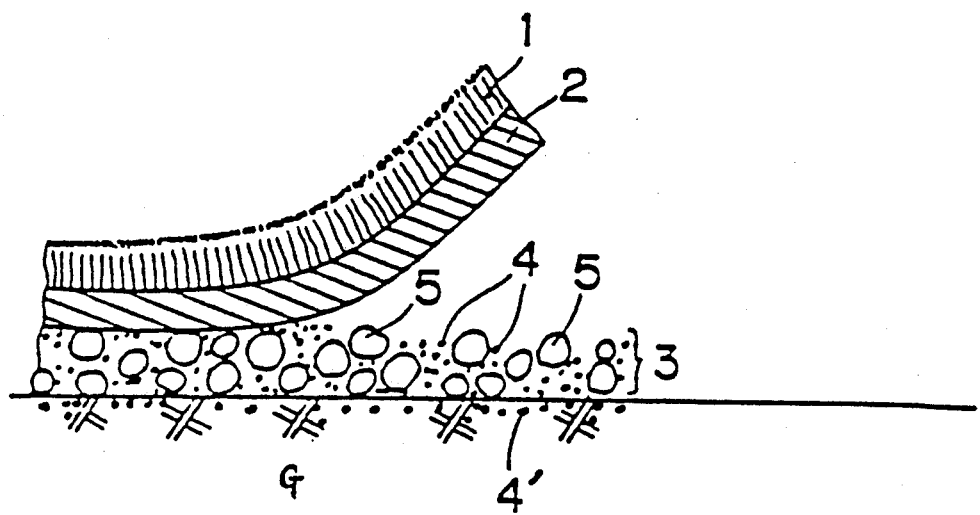

United States Patent [19]
Miyajima et al.

[11] Patent Number: 5,217,552
[45] Date of Patent: Jun. 8, 1993

[54] METHOD OF INSTALLING TILE-LIKE FLOOR MATERIAL

[75] Inventors: Norihisa Miyajima; Issei Ozaki; Akio Tanimoto, all of Urawa; Yasumasa Takao; Osamu Yoshikawa, both of Itami, all of Japan

[73] Assignees: Toyo Linoleum Company Limited, Hyogo; Saiden Chemical Industry Co., Limited, Tokyo, both of Japan

[21] Appl. No.: 753,543

[22] Filed: Sep. 3, 1991

Related U.S. Application Data

[63] Continuation-in-part of Ser. No. 483,175, Feb. 22, 1990, abandoned.

Foreign Application Priority Data

Feb. 22, 1989 [JP] Japan .................................. 1-40164
Jun. 14, 1989 [JP] Japan .................................. 1-150904

[51] Int. Cl.$^5$ .................................................. E04B 2/00
[52] U.S. Cl. .......................................... 156/71; 52/746; 156/152; 156/327; 156/344; 524/523; 524/803; 524/832; 525/228

[58] Field of Search ................ 156/71, 344, 152, 327; 52/746; 525/228; 524/523, 803, 832

[56] References Cited

U.S. PATENT DOCUMENTS

| | | | |
|---|---|---|---|
| 3,014,829 | 12/1961 | Curtin | 156/71 |
| 3,442,731 | 5/1969 | Anderson | 156/71 |
| 4,322,330 | 3/1982 | Merz et al. | 524/523 |
| 4,645,783 | 2/1987 | Kinoshita | 524/523 |

Primary Examiner—John J. Gallagher
Attorney, Agent, or Firm—Armstrong, Westerman, Hattori, McLeland & Naughton

[57] ABSTRACT

The present invention provides a pressure sensitive adhesive for a tile-like floor material wherein the adhesive includes a polymer A having a mean particle diameter of from 0.05 to 4 μ and a polymer B having a mean particle diameter of from 5 to 150 μ and in combination therewith, the polymer B being obtained by aqueous suspension polymerization in the presence of a partially saponified polyvinyl alcohol and being lower than the polymer A in glass transition point, and a method of installing the tile-like floor material which employs the adhesive.

4 Claims, 1 Drawing Sheet

METHOD OF INSTALLING TILE-LIKE FLOOR MATERIAL

This application is a continuation-in-part of application Ser. No. 07/483,175, filed Feb. 22, 1990, now abandoned.

The present invention relates to a pressure sensitive adhesive useful for installing a tile-like floor material such as tile carpet, and to a method of installing the tile-like floor material with use of the adhesive.

When the tile-like floor material to be installed is merely placed on the sub-flooring without applying any adhesive, there arises the problem that the floor material becomes dislodged by walking during use. However, use of an adhesive of high strength is not desirable since the adhesive is likely to cause damage to the backing of the floor material or to the sub-flooring when the floor material is to be installed in a different place or when the carpet is removed for maintenance during use.

The tile-like floor material is usually installed on a mortar sub-flooring. Often an adhesive is used when the mortar is not perfectly dry. The mortar is strongly alkaline when wet and deteriorates the adhesive used. As a result, the floor material is likely to bulge or separate from the sub-flooring by walking.

Further, when the floor material is washed with a cleaning agent which is alkaline, the agent deteriorates an adhesive between the floor material and the sub-flooring.

Accordingly, it is desired the adhesive be excellent in resistance to alkali.

An object of the present invention is to provide a pressure sensitive adhesive for tile-like floor materials which has suitable adhesion and which permits the floor material as installed to be readily removed. and a method of installing the tile-like floor material using the adhesive.

Another object of the present invention is to provide a pressure sensitive adhesive for tile-like floor materials which has an excellent resistance to alkali, and a method of installing the tile-like floor material using the adhesive.

The above and other objects of the invention will become apparent from the following description The present invention provides a pressure sensitive adhesive for tile-like floor materials wherein the adhesive comprises a polymer A having a mean particle diameter of from 0.05 to 4 $\mu$ and a polymer B having a mean particle diameter of from 5 to 150 $\mu$ and in combination therewith, the polymer B being obtained by aqueous suspension polymerization in the presence of a partially saponified polyvinyl alcohol and being lower than the polymer A in glass transition point, and a method of installing the tile-like floor material with use of the adhesive.

U.S. Pat No. 4,645,783 (Kinoshita) discloses an aqueous suspension composition comprising:

(A) adhesive copolymer microspheres having an average particle diameter of 10~100 $\mu$ prepared by aqueous suspension polymerization of the following monomers (a), (b) and (c) in the presence of a protective colloid comprising casein as a main ingredient:

(a) at least one monomer selected from the group consisting of alkyl acrylate esters and alkyl methacrylate esters, (b) at least one α-monoolefin carboxylic acids, and (c) at least one monomer other than the foregoing (a) and (b), selected from the group consisting of acrylates and methacrylates and (B) homopolymer or copolymer microparticles having an average particle diameter of 0.1~4 $\mu$ prepared by polymerization of at least one monomer selected from the group consisting of acrylates and methacrylates in an aqueous medium. Kinoshita's composition is employed in an adhesive sheet or tape, and is not taught to be suitable for installation of a tile-like floor material. Kinoshita's releasable composition employs casein in the synthesis of its ingredient (A) which corresponds to polymer B of the present method. However, Kinoshita's composition has a low alkali resistance.

According to the invention, the polymer A comprises a single synthetic resin, natural rubber, synthetic rubber or like adhesive composition or a mixture of such adhesive compositions. Useful synthetic resin compositions are those of a vinyl homopolymer or copolymer, which is preferably a polymer consisting primarily of an acrylic acid ester or methacrylic acid ester. While the properties required of the polymer are adjustable according to the kind and amount of monomer containing a functional group and to be used, the properties are adjustable also by controlling the glass transition point of the polymer A insofar as the adhesion of the polymer is not impaired. The mean particle diameter of the polymer A is preferably 0.05 to 4 $\mu$, more preferably 0.05 to 1 $\mu$, to ensure penetration into the sub-flooring and intimate contact with the floor material.

According to the invention, the polymer 8 is in the form of microspheres having a mean particle diameter of 5 to 150 $\mu$, preferably 20 to 60 $\mu$. For example, the polymer B is in the form of adhesive polymer microspheres prepared from (a) 70 to 99.9 wt. % of an alkyl (meth)acrylate having an alkyl group with 4 to 12 carbon atoms, (b) 0.1 to 10 wt. % of an α,β-unsaturated carboxylic acid and (c) 0 to 29.9 wt. % of a vinyl compound other than the two components (a) and (b), by subjecting these component monomers to aqueous suspension polymerization. Examples of useful alkyl (meth)acrylates (a) having an alkyl group with 4 to 12 carbon atoms are n-butyl (meth)acrylate, isobutyl (meth)acrylate, tert-butyl (meth)acrylate, n-pentyl (meth)acrylate, n-hexyl (meth)acrylate, 2-ethylhexyl (meth)acrylate. isooctyl (meth)acrylate, isononyl (meth)acrylate, lauryl (meth)acrylate and the like. Examples of useful α,β-unsaturated carboxylic acid (b) are acrylic acid, methacrylic acid, maleic acid, fumaric acid, itaconic acid and the like. Examples of useful vinyl monomers (c) are vinyl acetate, vinyl propionate, methyl (meth)acrylate, ethyl (meth)acrylate, styrene, acrylonitrile, 2-hydroxyethyl (meth)acrylate, N,N-dimethylaminoethyl acrylate, acrylamide, diacetone acrylamide, N-methylolacrylamide, glycidyl (meth)acrylate, aziridinylethyl (meth)acrylate and the like. The adhesive microspheres of polymer B can be prepared easily by the usual process of aqueous suspension polymerization. Useful dispersants are anionic surfactants and nonionic surfactants, which maybe used singly or in admixture. The microspheres can be prepared easily when a protective colloid is used. The particle diameter is adjustable by suitably determining the kinds and amounts of surfactant and protective colloid to be used and also by employing a particular method for the polymerization reaction. The desired particle diameter can be obtained, for example, by using an ingenious method of adding the monomer or emulsion dropwise when seed polymerization or multi-stage polymerization is resorted to. The modulus of elasticity of the adhesive polymer microspheres can be adjusted easily by using divinylbenzene, trimethylolpropane triacrylate or the like. It is also possible to filter off the adhesive polymer microspheres only from the aqueous suspension, drying the particles at a low temperature and dissolving the particles in an organic solvent for use. While the polymer B is used in an amount of 10 to 100 parts by weight per 100 parts by weight of the nonvolatile content of the polymer A, it is desirable to use 10 to 50 parts by weight of the polymer B to afford adhesion and releasability. When applied and dried, the fine polymer particles become arranged on the surface of the flooring to be covered with the floor material, playing an important role in giving adjusted adhesion.

According to the present invention, it is desired that the polymer A be at least $-50°$ C. in glass transition point (Tg) and that the polymer B be lower than $-50°$ C. in Tg. Thus, the polymer B is lower than the polymer A in Tg at all times. According to the invention, it is essential that the polymer B lower in Tg and higher in modulus of elasticity.

According to the invention, the combination of the polymer A and the polymer B exhibits the contemplated function. Stated more specifically, the adhesive, when applied, exhibits the contemplated function presumably through the following process. The component polymer A, which is as small as 0.05 to 4 $\mu$ in mean particle size, smoothly spreads over and penetrates into the sub-flooring, i.e., concrete. Accordingly, when the adhesive is applied to the surface of concrete, the polymer A immediately spreads to wet the surface and produce an adhering effect, further permitting substances chiefly including water to penetrate into the interior of concrete. This effect contributes to the dryability and intimate contact with the concrete, with the result that when the floor material is affixed to the concrete, the adhesive exhibits higher adhesion to the concrete surface and lower adhesion to the floor material. Accordingly, when the adhered floor material is to be removed, the adhesive is less likely to be transferred onto the material. This assists in achieving the object of the invention.

However, the requirement of releasability can not be fully fulfilled only with this feature; the above effect needs to be enhanced by the polymer B. Since the polymer B is larger in particle size, this polymer is unable to spread and penetrate smoothly and therefore eventually becomes arranged in intimate contact with the back surface of the floor material. Because of this phenomenon, the adhesive, when applied, has on the surface large and elastic particles which, although undergoing elastic deformation when subjected to pressure, remain free of deformation in contact with the back surface of the floor material and the surface of the sub-flooring over a diminished area when not subjected to pressure, as contemplated by the present invention. The combination of the polymer A and the polymer B according to the invention therefore affords a pressure sensitive adhesive which exhibits adhering ability along with releasability and which is highly suitable for use with floor materials.

Since the present pressure sensitive adhesive comprises the polymer A and the polymer B which are different in elasticity, the polymer A which is soft is in intimate contact with the entire surface of the floor material to prevent the separation of the material during use, while the polymer B which is elastic remains free of deformation in contact with the back surface of the floor material and with the sub-flooring (ground flooring) over a small area when not subjected to any pressure although undergoing elastic deformation when pressed on. Thus, the combination of two polymers gives adhesion and releasability, rendering the present pressure sensitive adhesive very suitable for use with floor materials.

To impart enhanced tackiness to the present adhesive, an aqueous dispersion of natural resin and/or petroleum resin may be added to the adhesive as a polymer C when so desired. Examples of useful natural resins and petroleum resins are aliphatic hydrocarbon resins, aromatic petroleum resins, cyclopentadiene resins, polyterpene resins, modified terpenes, rosin, rosin esters, hydrogenated rosin esters, phenolic resins, styrene resins, xylene resins and the like. Aqueous dispersions of natural resins and petroleum resins are necessary for giving adjusted adhesion and afford such adhesion, dryability, and anchorage and penetration into the sub-flooring that are in no way available with adhesives composed only of synthetic resins or rubbers. These resins can be used in an amount of up to about 50 parts by weight per 100 parts by weight of the nonvolatile content of the polymer A. Besides these resins, solvents such as alcohols, toluene and the like may be added to the adhesive.

The present invention further provides a method of installing a tile-like floor material characterized by providing the pressure sensitive adhesive described above between the tile-like floor material and sub-flooring.

The present invention will be described below with reference to the drawing. FIG. 1 is a sectional view showing how the invention is practiced. Indicated at 1 is the pile of tile carpet, and at 2 a resin backing. The pressure sensitive adhesive 3 of the invention is provided between the resin backing 2 and sub-flooring G. The adhesive 3 may be applied to the sub-flooring G when the tile carpet is to be laid, or provided as applied to the backing of the tile. According to the invention, the pressure sensitive adhesive comprises a polymer 4 and a polymer 5 in combination therewith. The polymer 4 is the polymer A. Indicated at 4' is the polymer A penetrating into the entire surface of the sub-flooring and contributing to the adhesion of the backing 2. The polymer 5 is the polymer B. The polymer 4 is higher than polymer 5 in Tg.

When the tile-like floor material is adhered to the sub-flooring with use of the adhesive of the structure described, the polymer A which is in the form of small soft microspheres is in contact with the sub-flooring G and the backing 2 over a large area. On the other hand, the polymer B which is usually spherical and elastic deforms to a flat shape when subjected to a load, contacting the sub-flooring over an increased area to exhibit enhanced strength. The adhesive has such characteristics that when a peeling force greater than a given magnitude acts on the floor material, the material easily peels off. These characteristics give good results to the prevention of dislodging and the adhesionpeeling cycle, rendering the adhesive very valuable for use with floor materials. While the floor materials for use in the present invention may be made of synthetic resins, ceramics, wood or the like, tile carpet and other flexible table-like floor materials are suitable.

(1) When the present pressure sensitive adhesive is used for installing tile carpet, good adhesion and releasability can be obtained, preventing the carpet from dislodging due to walking. The tile carpet can be peeled off easily for reinstallation in the event of error or for maintenance during use.

(2) When the floor material is installed in place with use of the present pressure sensitive adhesive and thereafter peeled off, the backing on the material remains free of damage.

(3) When the floor material is installed in place with use of the present pressure sensitive adhesive and thereafter peeled off, no adhesive sticks to the backing of the floor material.

(4) The floor material can be installed with improved efficiency since there is no need to consider the open time of the adhesive.

(5) Since the present pressure sensitive adhesive is excellent in resistance to alkali, the floor material is bonded with high adhesive strength even when the mortar sub-flooring is not sufficiently dried, and the floor material does not bulge or separate from the sub-flooring by walking. Further, when the floor material is washed with a cleaning agent, the adhesive is not deteriorated.

FIG. 1 is a sectional view showing the method of the invention as practiced.

The invention will be described in detail with reference to the examples and comparative examples.

EXAMPLE 1

Into a three-necked flask equipped with a thermometer, reflux condenser and speed-variable stirrer were placed 85 parts (by weight, the same as hereinafter) of butyl acrylate, 12 parts of vinyl acetate, 3 parts of acrylic acid, 2.0 parts of anionic surfactant, 0.5 part of nonionic surfactant and 100 parts of ion-exchanged water, which were then heated with stirring in a nitrogen stream. When the temperature of the reaction system reached 50° C., the system was initiated into polymerization with addition of 0.5 part of ammonium persulfate serving as a polymerization initiator. The polymerization reaction was conducted at 80° C. for about 3 hours. On completion of polymerization, the reaction mixture was heated to about 85° C. and further reacted for 1 hour to obtain a copolymer emulsion composition. To the emulsion composition was added 25% of aqueous solution of ammonia dropwise with stirring to prepare an acrylic copolymer emulsion having a viscosity of 8,000 cp (30° C.) and a nonvolatile content of 51.5%. The emulsion was −43° C. in glass transition point as determined by a differential scanning calorimeter, DSC-200 (product of Seiko Denshi Kogyo Co., Ltd.) and 0.3 μ in mean particle diameter as measured by a submicron particle analyzer, Model N4 (product of Coulter Electronics Inc.). The emulsion copolymer obtained will be referred to as the "polymer A".

Next, 100 parts of water and 3 parts of 20% solution of a partially saponified product of polyvinyl alcohol were thoroughly stirred in a container for preparing a polymer B. Subsequently. 45 parts of 2-ethylhexyl acrylate, 5 parts of butyl acrylate, 1.0 part of acrylic acid and 0.5 part of benzoyl peroxide were stirred in another container to obtain a solution. The solution of monomer mixture was added to the aqueous solution prepared previously, followed by stirring The mixture started polymerization at a stirring speed of 100 r.p.m. at a temperature of 70° to 75° C. and evolved heat markedly at 85° to 95° C. The mixture was then cooled to 81° to 82° C. for a further reaction for 2 hours, whereby an aqueous suspension of uniform particle size was produced in the reactor. The suspension was then subjected to the subsequent polymerization process. 2-Ethylhexyl acrylate (50 parts), 0.5 part of anionic surfactant, 1.5 parts of acrylic acid, 0.5 part of benzoyl peroxide and 50 parts of water were fully mixed together with stirring in another container. The whole amount of the mixture was added dropwise to the suspension over a period of 30 minutes, and the mixture was reacted at 80° to 83° C. for 4 hours. The reaction mixture was thereafter cooled and taken out to obtain an adhesive in the form of an aqueous suspension, which was 1,500 cp in viscosity (30° C.), 40% in nonvolatile content and −68° C. in Tg. The suspension was 50 μ in mean particle diameter as measured in a state cooled with liquid nitrogen by a scanning electron microscope JSM (product of JOEL, Ltd.) having Cryo Unit attached to its body.

Next, the component polymer A, the component polymer B and an aqueous dispersion (50% nonvolatile content) of glycerin ester of hydrogenated rosin serving as a component C were mixed together in the A:B:C ratio of 100:80:20 (by weight). With addition of defoaming agent, antioxidant and preservative, the mixture was stirred for 60 minutes to obtain a pressure sensitive adhesive for tile-like floor materials. The adhesive was 46.7% in nonvolatile content and 3,000 cps in viscosity (25° C.)

The adhesive was applied to a concrete surface in an amount of 100 g/m² with a trowel, tile carpet having polyvinyl chloride backing layer was affixed to the concrete under the condition stated below, peeled off about 1.5 months later and checked for adhesion, releasability and transfer of the adhesive to the back surface of the tile carpet.

EXAMPLE 2

Tile carpet was installed in the same manner as in Example 1 with a pressure sensitive adhesive prepared by the same procedure as in Example 1 with the exception of not using the component C.

EXAMPLE 3

Tile carpet was installed in the same manner as in Example 1 with use of a pressure sensitive adhesive prepared by the same procedure as in Example 1 except that the component A used was an acrylic adhesive, Saivinol At-351-1 (product of Saiden Chemical Industry Co., Ltd., 8,500 cp in viscosity, 50% in nonvolatile content, 0.8 μ in particle diameter and −40° C. in glass transition temperature).

EXAMPLE 4

Tile carpet was installed in the same manner as in Example 1 with use of a pressure sensitive adhesive prepared by the same procedure as in Example 3 with the exception of not using the component C.

COMPARATIVE EXAMPLE 1

The carpet was installed in the same manner as in Example 1 with use of a pressure sensitive adhesive prepared by the same procedure as in Example 1 with the exception of not using the component B.

COMPARATIVE EXAMPLE 2

The carpet was installed with use of an adhesive prepared by adding 20 parts of aqueous dispersion of glycerin ester of hydrogenated rosin as a component C to 100 parts of SBR latex (69% in nonvolatile content- ) and further adding a plasticizer, surfactant, defoaming agent and antioxidant to the mixture. Table 1 shows the results.

TABLE 1

|  | Example | | | | Com. Ex. | |
| --- | --- | --- | --- | --- | --- | --- |
|  | 1 | 2 | 3 | 4 | 1 | 2 |
| Initial tack | | | | | | |
| a | A | A | A | A | A | A |
| b | A | A | A | A | A | A |
| c | A | A | A | A | A | A |
| d | A | A | A | A | A | B |
| e | A | A | A | A | B | B |
| Adhesion after peeling | | | | | | |
| a | A | A | A | A | A | B |
| b | A | A | A | A | A | B |
| c | A | A | A | A | A | B |
| d | A | A | A | A | A | B |
| e | A | A | A | A | A | B |
| Transfer to the backing | | | | | | |
| a | A | A | A | A | C | B |
| b | A | A | A | A | C | B |
| c | A | A | A | A | B | B |
| d | A | A | A | A | B | A |
| e | A | A | A | A | B | A |
| Releasability | A | A | A | A | B | B |

Note)
1. Initial tack
A: the adhesive has sufficient initial tack
B: the adhesive has no initial tack
2. Adhesive after peeling
A: the adhesive has good adhesion after peeling
B: the adhesive has insufficient adhesion after peeling
3. Transfer to the backing
A: no adhesive is transferred
B: the adhesive is slightly transferred
C: the adhesive is markedly transferred
4. Releasability
A: the adhesive has excellent releasability
B: the adhesive has insufficient releasability The adhesive was applied with an open time of 0 minutes for "a", with an open time of 10 minutes for "b", 60 minutes for "c", 300 minutes for "d" and 600 minutes for "e".

In Examples 1 to 4, each pressure sensitive adhesive had sufficient initial tack and exhibited good adhesion again after the tile carpet was removed irrespective of the open time. Further none of the adhesive was transferred to the carpet backing. This indicates excellent releasability.

In Comparative Example 1, the pressure sensitive adhesive had no initial tack, and transfer of the adhesive occured in case e. In Comparative Example 2, the pressure sensitive adhesive in cases d and e had no initial tack nor any adhesion after peeling, was transferred to the backing and was therefore unsuitable as a pressure sensitive adhesive having releasability.

TEST EXAMPLE 1

1. Preparation of aqueous suspension of components (I) of Example 1 of U.S. Pat. No. 4,645,783 (Kinoshita)

An aqueous suspension polymerization was conducted according to Example 1 of Kinoshita with use of components (I) to prepare an aqueous suspension containing a polymer (hereinafter referred to as "Polymer B-1") having particle size of 20 to 60 μ. This suspension was one prepared in the presence of casein.

2. Preparation of an adhesive for comparison

The component Polymer A obtained in Example 1 of the present invention, Polymer B-1 and an aqueous dispersion (50 nonvolatile content) of glycerin ester of hydrogenated rosin serving as a component C were mixed together in the A:B:C ratio of 100:80:20 (by weight). With addition of defoaming agent, antioxidant and preservative, the mixture was stirred for 60 minutes to obtain a pressure sensitive adhesive for tile-like floor materials. This adhesive is referred to as "Adhesive (I)".

3. As the adhesive of the present invention was used that of Example 1 of the present invention. This adhesive is mainly composed by Polymer A, Polymer B and component C in the A:B:C ratio of 100:80:20 (by weight) as shown on page 12, lines 2 to 9 of the present specification, and is referred to as "Adhesive (II)". Table 2 shows the composition of the main components of Adhesives (I) and (II).

TABLE 2

|  | Adhesive (I) (Kinoshita) | Adhesive (II) (present invention) |
| --- | --- | --- |
| Polymer A | 100 | 100 |
| Polymer B | — | 80 |
| Polymer B-1 | 80 | — |
| Component C | 20 | 20 |

4. Test for adhesive strength of Adhesives (I) and (II)

Each of Adhesives (I) and (II) was applied to a slate plate in an amount of 100 g/m² with a trowel, tile carpet was affixed to the slate plate after 15 minutes and dipped for 24 hours in 5% aqueous solution of sodium hydroxide 3 days later. The adhesive strength of 90° peeling was checked by use of Tensilon tensile tester according to JIS Z 153. The results were given in Table 3.

TABLE 3

| Adhesive | adhesive strength | | (%) remained |
| --- | --- | --- | --- |
|  | initial | after dipping in alkali |  |
| (I) | 4.45 kg | 1.15 kg | 25.8% |
| (II) | 4.52 kg | 2.76 kg | 61.1% |

The adhesive of the present invention is much higher in adhesive strength (2.37 times) after dipping in alkali than the adhesive for comparison according to Kinoshita which contains Polymer B-1 prepared by suspension polymerization in the presence of casein.

We claim:
1. A method of installing a tile-like floor material comprising providing a pressure sensitive adhesive between the tile-like floor material and sub-flooring, the adhesive comprising a polymer A having a mean particle diameter of from 0.05 to 4 μ and a polymer B having a mean particle diameter of from 5 to 150 μ and in combination therewith, the polymer B being obtained by aqueous suspension polymerization in the presence of a partially saponified polyvinyl alcohol and being lower than the polymer A in glass transition point.
2. A method as defined in claim 1 wherein the polymer A is one selected from the group consisting of vinyl homopolymer, vinyl copolymer, natural rubber and synthetic rubber.
3. A method as defined in claim 1 wherein the polymer B is in the form of adhesive polymer microspheres prepared from (a) 70 to 99.9 wt. % of an alkyl (meth)acrylate having an alkyl group with 4 to 12 carbon atoms, (b) 0.1 to 10 wt. % of an α,β-unsaturated carboxylic acid and (c) 0 to 29.9 wt. % of a vinyl compound other than the two components (a) and (b), by subjecting these component monomers to aqueous suspension polymerization.
4. A method as defined in claim 1 wherein a natural resin or petroleum resin is further added to the adhesive, in an amount of up to about 50 parts by weight per 100 parts by weight of the nonvolatile content of the polymer A.

* * * * *